(12) United States Patent
Gross

(10) Patent No.: US 6,821,937 B2
(45) Date of Patent: Nov. 23, 2004

(54) HARD SURFACE CLEANING COMPOSITION

(75) Inventor: Stephen F. Gross, Souderton, PA (US)

(73) Assignee: Cognis Corporation, Cincinnati, OH (US)

( * ) Notice: Subject to any disclaimer, the term of this patent is extended or adjusted under 35 U.S.C. 154(b) by 0 days.

(21) Appl. No.: 10/648,060

(22) Filed: Aug. 26, 2003

(65) Prior Publication Data

US 2004/0038847 A1 Feb. 26, 2004

Related U.S. Application Data

(63) Continuation of application No. 09/643,141, filed on Aug. 22, 2000, now abandoned, which is a continuation of application No. 09/359,555, filed on Jul. 22, 1999, now abandoned, which is a continuation-in-part of application No. 09/263,463, filed on Mar. 5, 1999, now abandoned.

(51) Int. Cl.$^7$ .............................. C11D 1/83; C11D 3/44; C11D 17/00
(52) U.S. Cl. ....................... 510/365; 510/417; 510/424; 510/505; 510/506
(58) Field of Search .................................. 510/365, 421, 510/424, 434, 417, 407, 505, 506

(56) References Cited

U.S. PATENT DOCUMENTS

| | | | | |
|---|---|---|---|---|
| 5,080,831 A | * | 1/1992 | VanEenam | 510/365 |
| 5,391,325 A | * | 2/1995 | Swenson et al. | 510/513 |
| 5,585,341 A | * | 12/1996 | Van Eenam | 510/365 |
| 6,096,699 A | * | 8/2000 | Bergemann et al. | 510/210 |

* cited by examiner

*Primary Examiner*—Gregory Webb
(74) *Attorney, Agent, or Firm*—Aaron R. Ettelman; Steven J. Trzaska; Daniel S. Ortiz

(57) ABSTRACT

Terpene-free hard surface cleaning compositions comprised of a $C_1$–$C_4$ alkyl ester of a $C_6$–$C_{22}$ saturated or unsaturated carboxylic acid and a surfactant having an HLB of from about 4 to about 10 are effective in cleaning hard surfaces. Terpene-free microemulsions having improved high and low temperature stability are also effective for cleaning hard surfaces and are comprised of an anionic surfactant; a primary solvent consisting of a $C_1$–$C_4$ alkyl ester of a $C_6$–$C_{22}$ saturated or unsaturated carboxylic acid and a short-chain cosurfactant. The disclosed cleaning compositions are especially effective in removing graffiti and paint from surfaces.

52 Claims, No Drawings

HARD SURFACE CLEANING COMPOSITION

CROSS-REFERENCE TO RELATED APPLICATIONS

This application is a continuation-in-part of application Ser. No. 09/263,463, filed on Mar. 5, 1999 now abandoned, the entire contents of which are incorporated herein by reference. This application is also a continuation of Ser. No. 09/359,555, filed Jul. 22, 1999, now abandoned and a continuation of Ser, No. 09/643,141 filed Aug. 22, 2000, now abandoned.

STATEMENT REGARDING FEDERALLY SPONSORED RESEARCH OR DEVELOPMENT

Not Applicable.

BACKGROUND OF THE INVENTION

The present invention generally relates to a cleaning composition for hard surfaces. More particularly, the invention relates to a novel hard surface cleaning formulation having superior cleaning ability which is free of VOC-containing solvents.

General purpose household cleaning compositions for hard surfaces such as metal, glass, ceramic, plastic and linoleum surfaces are commercially available in both powdered and liquid form. Powdered cleaning compositions consist mainly of builder or buffering salts such as phosphates, carbonates, and silicates and although such compositions may display good inorganic soil removal, they exhibit inferior cleaning performance on organic soils such as greasy/fatty/oily soils.

Liquid cleaning compositions, on the other hand, have the great advantage that they can be applied to hard surfaces in neat or concentrated form so that a relatively high level of surfactant material is delivered directly to the soil. Moreover, it is a rather more straightforward task to incorporate high concentrations of anionic or nonionic surfactant in a liquid rather than a granular composition. For both of these reasons, therefore, liquid cleaning compositions have the potential to provide superior grease and oily soil removal over powdered cleaning compositions.

Nevertheless, liquid cleaning compositions suffer a number of drawbacks which can limit their consumer acceptability. Thus, they generally contain little or no detergency builder salts and consequently they tend to have poor cleaning performance on particulate soil and also lack effectiveness under varying water hardness levels. In addition, they can suffer problems relating to homogeneity, clarity, and viscosity when used by consumers. Moreover, the higher in-use surfactant concentration necessary for improved grease soil removal causes further problems relating to extensive suds formation requiring frequent rinsing and wiping on behalf of the consumer.

A solution to the above-identified problems has involved the use of saturated and unsaturated terpenes, in combination with a polar solvent, in order to increase the cleaning effectiveness of the hard surface cleaner and control sudsing. A problem associated with the use of terpenes such as, for example, d-limonene, is that their price, as a raw material, tends to fluctuate wildly. Consequently, the cost to manufacture hard surface liquid cleaners containing terpene solvents is financially disadvantageous to both producers and consumers.

Other solvents which are often employed in hard surface cleaning compositions, instead of terpenes, include those derived from aliphatic, aromatic and halogenated hydrocarbons. Their use, however, is undesirable for environmental reasons due to the presence of volatile organic compounds (VOC's) therein.

Consequently, it would be highly desirable to employ a solvent which is both free of volatile organic compounds and is not subject to any significant fluctuations in pricing for the raw material.

One approach to overcoming the above limitations is a terpene-free hard surface cleaning composition which is a microemulsion comprised of a nonionic surfactant, an anionic surfactant; a primary solvent consisting of a $C_6$–$C_{22}$ methyl ester; a short-chain cosurfactant; and water as described in copending application Ser. No. 08/954,012, filed on Oct. 20, 1997. Such microemulsions exhibit limited high and low temperature stability. Therefore, an object of the present invention is a microemulsion containing a $C_1$–$C_4$ alkyl ester of a $C_6$–$C_{22}$ saturated or unsaturated carboxylic acid having improved high and low temperature stability as evidenced by being clear and homogeneous over a temperature range broader than that previously achieved with similar microemulsions.

SUMMARY OF THE INVENTION

One aspect of the present invention pertains to a terpene-free hard surface cleaning composition comprised of a $C_1$–$C_4$ alkyl ester of a $C_6$–$C_{22}$ saturated or unsaturated carboxylic acid and a surfactant having an HLB of from about 4 to about 10.

Another aspect of the present invention pertains to a terpene-free hard surface cleaning composition which is a microemulsion having improved high and low temperature stability comprised of an anionic surfactant; a primary solvent consisting of a $C_1$–$C_4$ alkyl ester of a $C_6$–$C_{22}$ saturated or unsaturated carboxylic acid and a short-chain cosurfactant. The present invention is also directed to a process for cleaning a hard surface involving contacting the hard surface with one of the above-disclosed cleaning compositions over a predetermined length of time.

BRIEF DESCRIPTION OF THE SEVERAL VIEWS OF THE DRAWING

Not Applicable.

DETAILED DESCRIPTION

Other then in the operating examples, or where otherwise indicated, all numbers expressing quantities of ingredients or reaction conditions used herein are to be understood as being modified in all instances by the term "about".

The term primary solvent as used herein refers to $C_1$–$C_4$ alkyl esters of saturated or unsaturated $C_6$–$C_{22}$ carboxylic acids such as, for example, methyl ester of a $C_8$–$C_{10}$ carboxylic acid.

One aspect of the present invention pertains to a terpene-free hard surface cleaning composition comprised of a $C_1$–$C_4$ alkyl ester of a $C_6$–$C_{22}$ saturated or unsaturated carboxylic acid and a surfactant having an HLB of from about 4 to about 10. The $C_1$–$C_4$ alkyl esters of saturated or unsaturated $C_6$–$C_{22}$ carboxylic acids suitable for use in the present hard surface cleaning composition are compounds of the formula II:

$$R_1COOR_2 \qquad \text{II}$$

wherein $R_1$ is an alkyl or alkenyl radical having from about 6 to about 22 carbon atoms and $R_2$ is an alkyl radical having from 1 to 4 carbon atoms. They are derived by the esterification of a saturated or unsaturated $C_6$–$C_{22}$ carboxylic acid with an appropriate alcohol. The primary solvents can also be mixtures of saturated and unsaturated $C_6$–$C_{22}$ carboxylic acids as would be the case wherein the acids are derived from naturally occurring fatty acids. Preferred primary solvents are those derived from the direct esterification of $C_{8-10}$ saturated and/or unsaturated fatty acids with methanol or the transesterification of naturally-occurring fats and/or oils with methanol. Suitable fatty acids from which the fatty acid esters may be derived include, but are not limited to, coconut and other vegetable oils, tallow, etc. Esters such as the methyl esters of $C_{8-10}$ saturated carboxylic acids are particularly preferred one example of which is a mixture of methyl esters of 55% $C_8$ and 40% $C_{10}$ carboxylic acid. Such esters as commercially available as, for example, EMERY® 2209 methyl esters, a trademark product of Henkel Corporation, Cincinnati, Ohio.

Any surfactant having an HLB (hydrophile-lipophile balance) of from about 4 to about 10, preferably from 4 to 8, can be used in the composition according to the invention. Such surfactants are well known to those of ordinary skill in the art and can be found, for example, in McCutcheon's Emulsifiers & Detergents, 1997 Annuals. Especially preferred surfactants of this type include the isopropyl amine salt of dodecylbenzene sulfonic acid, linear alcohol ethoxylates, nonyl phenol ethoxylates, fatty amides, fatty amine ethoxylates, sorbitan esters, glycerol esters and combinations thereof.

Cleaning compositions which are comprised of a $C_1$–$C_4$ alkyl ester of a $C_6$–$C_{22}$ saturated or unsaturated carboxylic acid and a surfactant having an HLB of from about 4 to about 10 can be used as is on the surface to be cleaned and then washed off the surface with water.

Another aspect of the present invention pertains to a terpene-free hard surface cleaning composition which is a microemulsion having improved high and low temperature stability comprised of an anionic surfactant; a primary solvent consisting of a $C_1$–$C_4$ alkyl ester of a $C_6$–$C_{22}$ saturated or unsaturated carboxylic acid and a short-chain cosurfactant.

Suitable anionic surfactants include, but are not limited to, water-soluble salts of alkyl benzene sulfonates, alkyl sulfates, alkyl polyethoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, alkyl phenol polyethoxyether sulfates and combinations thereof.

Other suitable anionic surfactants include the water-soluble salts or esters of alpha-sulfonated fatty acids containing from about 6 to about 20 carbon atoms in the fatty acid group and from about 1 to about 10 carbon atoms in the ester group.

A particularly preferred anionic surfactant for use in the present invention is the isopropylamine salt of a C10–14 alkyl benzene sulfonic acid. More than one anionic surfactant can be used, and in some instances, is preferred.

Suitable short-chain cosurfactants for use in the present invention include, but are not limited to, $C_3$–$C_6$ alcohols, glycols, glycol ethers, pyrrolidones and glycol ether esters. Particularly preferred short-chain cosurfactants include n-butyl alcohol and propylene glycol n-butyl ether. The microemulsions according to the invention can be prepared by mixing the ingredients together.

The amount of primary solvent that can be used in the microemulsion composition depends on the composition's end use. For example, if the microemulsion is used to completely remove an undesirable substance from a hard surface such as, for example, stripping paint from a painted surface, the amount of primary solvent will typically vary from about 80 to about 95% by weight, based on the weight of the microemulsion.

On the other hand, if the microemulsion is used to remove an undesirable substance, such as paint or graffiti, from a coated surface, such as a painted wall or railroad boxcar, the amount of primary solvent will typically vary from about 25 to about 60% by weight, based on the weight of the microemulsion.

The relative amounts of the components of the cleaning composition according to the invention will vary according to the end use of the composition and can be any amounts required to clean a particular undesirable substance from a particular surface. For most applications, the amount of anionic surfactant can vary from about 5 to about 14% by weight of the total composition. The amount of short-chain cosurfactant can vary from about 5 to about 13% by weight of the total composition.

The cleaning compositions according to the invention can be used in a wide variety of applications which include, but are not limited to, the removal of grease, oil, ink, chewing gum and paint from hard and porous surfaces including all kinds of natural and synthetic fabrics in both industrial-institutional and consumer applications. Examples of the disparate types of applications include, but are not limited to, the use of the cleaning compositions according to the invention as water rinsable paint brush cleaners for brushes having both natural and synthetic bristles. Another use is as a cleaner for human skin and nails such as hand and finger nail cleaner for the removal of paints, greases, glues, nail polish and the like. The cleaning compositions according to the invention can also be used for a spot cleaner for removing grease, oil and paints from carpets and rugs and as a prespotter in laundry applications for the removal of stains from fabrics. Other applications include the removal of grease such as lithium and molybdenum greases from steel and concrete surfaces such as, for example, wheel bearings or garage floors having grease and oil stained tire tracks and the like. The cleaning compositions according to the invention can also be used to clean the concrete and metal surfaces of off-shore oil drilling platforms.

The cleaning compositions according to the invention can also contain an effective amount of odor masking agents such as natural products, for example, essential oils; aroma chemicals; perfumes and the like. Examples of natural products include, but are not limited to, ambergris, benzoin, castoreum, civet, clove oil, galbanum, jasmine, rosemary oil, sandalwood, and the like. Examples of aroma chemicals include, but are not limited to, isoamyl acetate (banana); isobutyl propionate (rum); methyl anthranilate (grape); benzyl acetate (peach); methyl butyrate (apple); ethyl butyrate (pineapple); octyl acetate (orange); n-propyl acetate (pear); ethyl phenyl acetate (honey). The cleaning compositions according to the invention can contain any combination of the above types of compounds. An effective amount of such odor masking agents in the cleaning compositions according to the invention is any amount necessary to produce an odor masking effect or reduce an unwanted odor to an acceptable level. Such an amount will be readily determinable by those skilled in the art. The amount of odor masking agent will typically vary from about 0.25% to about 1.00% by weight of the cleaning composition with the preferred amount being from about 0.4% to about 0.6%.

The cleaning compositions according to the invention can be packaged in a variety of containers such as steel, tin, and aluminum cans and plastic and glass bottles. The cleaning compositions can be applied by a variety of application means which include, but are not limited to spraying such as in aerosol form or other spraying means such as by standard spray nozzles when used to remove dirt and grime from trucks and railroad cars; brush application; dipping; coating; application in gel form such as from a squeeze bottle or brush. The cleaning compositions according to the invention can be formulated in gel form by the addition of an effective amount of a gelling agent such as fumed silica, organic gums, polymers, paraffin wax, bentonite clay, and cellulose ethers such as methyl cellulose and hydroxypropyl methyl cellulose commercially available as METHOCEL® cellulose ethers, trademark products of Dow Chemical.

An in-can corrosion problem can arise when the cleaning compositions according to the invention are packaged in cans. Cans, and particularly aerosol cans, are generally made from steel and are, therefore, susceptible to corrosion by products containing water. Products containing water, such as the composition according to the invention, require the addition of a corrosion inhibitor to prevent corrosion of the can and contamination of the formulation in the can. When the formulation according to the invention is in the form of a microemulsion, the microemulsion is susceptible to destabilization by the addition of ions to the formulation. It is therefore necessary to use a corrosion inhibitor that will not contribute to the destabilization of the microemulsion. Corrosion inhibitors that are compatible with the microemulsion composition according to the invention must be selected such that they do not contribute an amount of ions to the formulation that will destabilize the microemulsion. Preferably the inhibitor will be a molecule that has both an oil soluble portion and a water soluble portion. It has been found that an amphoteric surfactant containing an amine functionality in an amount of from about 0.05% to about 2% by weight, and preferably from about 0.25% to about 1.0%, acts as a corrosion inhibitor when combined with the microemulsion composition according to the invention, does not break the microemulsion and is effective in prevention of corrosion. Examples of suitable corrosion inhibitors include the DERIPHAT® amphoteric surfactants, particularly advantageous is DERIPHAT® 151–C, available from Henkel Corporation, Ambler Pa. Other corrosion inhibitors that can be used with the composition according to the invention include, but are not limited to, amine soaps of fatty acids and fatty alkanolamides such as the $C_8$ to $C_{18}$ fatty alkanolamides, examples of which include STANDAMID® alkanolamides, available from Henkel Corporation. Such corrosion inhibitors can also be used for post-application anti-corrosion effects on surfaces that will rust or corrode because of the presence of water in the cleaning compositions according to the invention such as on metal surfaces such as iron and steel and the like. The amount of the corrosion inhibitors required for post-application purposes is any amount effective to inhibit or prevent corrosion of a metal surface onto which the cleaning compositions according to the invention are applied.

It should be noted that additional auxiliaries may also be incorporated into the hard surface cleaning composition of the present invention without departing from the spirit of the invention. Examples of suitable auxiliaries which may be used include, but are not limited to, amphoteric surfactants, zwitterionic surfactants, pH buffering agents, dyes, perfumes, enzymes, preservatives, thickeners, hydrotropes, corrosion inhibitors and the like.

In some cases it is desirable to package the cleaning compositions, according to the invention, in cans, such as aerosol cans to facilitate application of the cleaning compositions in the field. Cans, and particularly aerosol cans, are generally made from steel, so are susceptible to corrosion by products containing water. Products containing water, such as the composition according to the invention, require the addition of a corrosion inhibitor to prevent corrosion of the can and contamination of the formulation in the can. When the formulation according to the invention is in the form of a microemulsion, the microemulsion is susceptible to destabilization by the addition of ions to the formulation. It is therefore necessary to use a corrosion inhibitor that will not contribute to the destabilization of the microemulsion. Corrosion inhibitors that are compatible with the microemulsion composition according to the invention must be selected such that they do not contribute an amount of ions to the formulation that will destabilize the microemulsion. Preferably the inhibitor will be a molecule that has both an oil soluble portion and a water soluble portion. It has been found that an amphoteric surfactant containing an amine functionality in an amount of from about 0.05% to about 2% by weight, and preferably from about 0.25% to about 1.0%, acts as a corrosion inhibitor when combined with the microemulsion composition according to the invention, does not break the microemulsion and is effective in prevention of corrosion. Examples of suitable corrosion inhibitors include the DERIPHAT® amphoteric surfactants, particularly advantageous is DERIPHAT® 151-C, available from Henkel Corporation, Ambler Pa. Other corrosion inhibitors that can be used with the composition according to the invention include, but are not limited to, amine soaps of fatty acids and fatty alkanolamides such as the $C_8$ to $C_{18}$ fatty alkanolamides, examples of which include STANDAMID® alkanolamides, available from Henkel Corporation.

According to one preferred embodiment of the present invention, there is provided a terpene-free microemulsion for cleaning hard surfaces containing: (a) from about 5% to about 10% by weight of an anionic surfactant, preferably amine salts of fatty acids or of dodecyl benzene sulfonic acid, (b) from about 40% to about 50% by weight of a primary solvent, preferably a methyl ester of a $C_8$–$C_{10}$ saturated or unsaturated carboxylic acid, (c) from about 5% to about 15% by weight of a short-chain cosurfactant, preferably n-butyl alcohol or propylene glycol n-butyl ether and (d) water wherein all weights are based on the total weight of the composition.

According to another embodiment of the present invention, there is provided a process for cleaning a hard surface involving contacting the hard surface with the above-disclosed composition.

As set forth above, the precise amount of methyl ester solvent present in the composition depends on the type of cleaning to be performed. Hence, if a hard surface is to be completely stripped of any and all coatings thereon, the amount of methyl ester solvent present in the composition will range from about 50 to about 95% by weight, based on the weight of the composition. Similarly, if an undesirable substance, such as graffiti, is to be removed from a coated hard surface without damaging the underlying coating, the amount of methyl ester solvent present in the composition will range from about 15 to about 50% by weight, based on the weight of the composition.

However, another variable associated therewith is the dwell-time of the composition. Thus, if a hard surface is to be completely stripped of any coating substances, as is the case in paint stripping, the dwell-time of the composition on the hard surface will range from about 20 to about 45 minutes.

On the other hand, if an undesirable substance, such as graffiti, is to be removed from a coated hard surface without damaging the underlying coating, the dwell time of the composition on the hard surface will range from about 2 to about 20 minutes.

Another aspect of the present invention is a process for cleaning a hard surface involving contacting the hard surface with an effective amount of one of the above-disclosed cleaning compositions for a period of time effective to clean the surface.

The present invention will be better understood by the examples which follow, all of which are intended for illustrative purposes only, and are not meant to unduly limit the scope of the invention in any way. Unless otherwise indicated, percentages are on a weight-by-weight basis.

EXAMPLE 1

| | |
|---|---|
| Test Soil: | Krylon blue #1901 acrylic spray paint |
| Substrate: | Stainless steel |

The soil was applied to the substrate and allowed to cure for 24 hrs. at 72° F. One drop of each of the microemulsion compositions disclosed in example 2 below was applied to the cured soil, and after 2 minutes was rinsed with a stream of water. Both compositions were observed to completely remove the cured spray paint from the substrate in the region of contact.

EXAMPLE 2

| Relative Stability of Microemulsions | | |
|---|---|---|
| | A[1] | B[2] |
| EMERY ® 2209[3] | 41.0 | 46.5 |
| CALIMULSE ® PRS[4] | 7.0 | 7.1 |
| DOWANOL ® PnB[5] | 8.0 | 9.0 |
| GLUCOPON ® 425N[6] | 6.0 | — |
| STANDAPOL ® WAQ-LC[7] | — | 5.3 |
| Water | 38.0 | 32.1 |
| | Cloud point, ° F. low/high | |
| | 55/106 | 49/>160 |

[1]Microemulsion containing anionic and nonionic surfactant.
[2]Microemulsion containing anionic surfactant only.
[3]EMERY ® 2209 is a methyl ester of a $C_{8-10}$ carboxylic acid comprised of approx. 55% $C_8$ and 40% $C_{10}$ carboxylic acid.
[4]CALIMULSE ® PRS is the isopropylamine salt of a linear alkyl benzene sulfonic acid.
[5]DOWANOL ® PnB is propylene glycol n-butyl ether.
[6]GLUCOPON ® 425N is a 50% active solution of alkyl polyglycoside in which the alkyl group contains 8 to 16 carbon atoms and having an average degree of polymerization of 1.48.
[7]STANDAPOL ® WAQ-LC is sodium lauryl sulfate, 30% active solution.

The cloud point data show that formulation B exhibits a much larger temperature range of stability, remaining clear and uniform from 49° F. to above 160° F., while formulation A, which contains a nonionic surfactant, was cl ar and uniform in the smaller temperature range of from 55° F. to 106° F.

What is claimed is:

1. A terpene-free hard surface cleaning composition comprising: (a) a anionic surfactant; (b) a primary solvent comprised of a $C_1$–$C_4$ alkyl ester of a $C_6$–$C_{22}$ saturated or unsaturated carboxylic acid; (c) a short-chain cosurfactant; and (d) water, and wherein the composition is free of non-ionic surfactants.

2. The composition of claim 1 wherein the anionic surfactant is selected from the group consisting of alkali metal salts of fatty acids, organic base salts of fatty acids, alkyl sulfates, alkyl ether sulfates, alkyl aromatic sulfonates, alkyl sulfonates, alpha olefin sulfonates, sulfosuccinates, and mixtures thereof.

3. The composition of claim 1 wherein the primary solvent is a methyl ester of a $C_{8-10}$ to saturated carboxylic acid.

4. The composition of claim 1 wherein the primary solvent is a mixture comprised of the methyl esters of 55% $C_8$ and 40% $C_{10}$ carboxylic acids.

5. The composition of claim 1 wherein the short-chain cosurfactant is a $C_3$–$C_6$ alcohol, a glycol, a glycol ether, a pyrrolidinone and a glycol ether esters.

6. The composition of claim 5 wherein the short-chain cosurfactant is n-butyl alcohol and propylene glycol n-butyl ether.

7. The composition of claim 1 wherein the amount of the primary solvent in the composition is from about 80% to about 95% by weight.

8. The composition of claim 1 wherein the amount of the primary solvent in the composition is from about 25% to about 60% by weight.

9. A terpene-free microemulsion for cleaning hard surfaces comprising: (a) from about 5% to about 10% by weight of en anionic surfactant, (b) from about 40% to about 50% by weight of a $C_1$–$C_4$ alkyl ester of a $C_6$–$C_{22}$ saturated or unsaturated carboxylic acid, (c) from about 5% to about 15% by weight of a short-chain cosurfactant and (d) water wherein all weights are based on the total weight of the emulsion, and wherein the emulsion is free of non-ionic surfactants.

10. The microemulsion of claim 9 wherein the anionic surfactant is selected from the group consisting of alkali metal salts of fatty acids, organic base salts of fatty snide, alkyl sulfates, alkyl ether sulfates, alkyl aromatic sulfonates, alkyl sulfonates, alpha olefin sulfonates, sulfosuccinates, and mixtures thereof.

11. The microemulsion of claim 9 wherein the primary solvent is a methyl ester of a $C_{8-10}$ saturated carboxylic acid.

12. The microemulsion of claim 9 wherein the primary solvent is a mixture comprised of the methyl esters of 55% $C_8$ end 40% $C_{10}$ carboxylic acid.

13. The microemulsion of claim 9 wherein the short-chain cosurfactant is a $C_3$–$C_6$ alcohol, a glycol, a glycol other, a pyrrolidone and a glycol ether esters.

14. The microemulsion of claim 13 wherein the short-chain cosurfactant is n-butyl alcohol and propylene glycol n-butyl ether.

15. The microemulsion of claim 9 wherein the amount of the primary solvent is from about 80% to about 95% by weight.

16. The microemulsion of claim 9 wherein the mount of the primary solvent is from shout 75% to about 60% by weight.

17. The microemulsion of claim 9 further comprising a corrosion inhibitor.

18. The microemulsion of claim 17 wherein the corrosion inhibitor is selected from the group consisting of an amphoteric surfactant containing an amine functionality, an amine soap of a fatty acid, a fatty amide and combinations thereof.

19. The microemulsion of claim 17 wherein the corrosion inhibitor is an amphoteric surfactant containing an amino functionality.

20. The microemulsion of claim 13 wherein the amount of corrosion inhibitor is from about 0.05% to about 2% by weight of the total composition.

21. A terpene-free microemulsion for cleaning hard surfaces comprising: (a) from shout 5% to about 10% by weight of an amine salt of a fatty acid or an amine salt of a dodecyl benzene sulfonic acid, (b) from about 40% to about 50% by weight of a methyl ester of a $C_8$–$C_{10}$ saturated or unsaturated carboxylic acid, (c) from about 5% to about 15% by weight of n-butyl alcohol or propylene glycol n-butyl ether and (d) water wherein all weight, are based on the total weight of the emulsion, and wherein the emulsion free of non-ionic surfactants.

22. A terpene-free microemulsion for cleaning hard surfaces which is the product of the process which comprises mixing: (a) an anionic surfactant; (b) a primary solvent comprised of a $C_1$–$C_4$ alkyl ester of a $C_6$–$C_{22}$ saturated or unsaturated carboxylic acid and; (c) a short-chain cosurfactant; and (d) water, and wherein the composition is free of non-ionic surfactants.

23. A terpene-free microemulsion for cleaning hard surfaces which is the product of the process which comprises mixing: (a) from about 5% to about 10% by weight of an amine salt of a fatty acid or an amine salt of a dodecyl benzene sulfonic acid, (b) from about 40% to about 50% by weight of a methyl ester of a $C_8$–$C_{10}$ saturated or unsaturated carboxylic acid, (c) from about 5% to about 15% by weight of n-butyl alcohol or propylene glycol n-butyl ether and (d) water wherein all weights are based on the total weight of the emulsion, and wherein the emulsion is free of non-ionic surfactants.

24. A terpene-free hard surface cleaning composition comprised of: (a) a $C_1$–$C_4$ alkyl ester of a $C_6$–$C_{22}$ saturated or unsaturated carboxylic acid, and (b) a surfactant having an HLB of from about 4 to about 10, and wherein the composition is free of non-ionic surfactants.

25. The composition of claim 24 wherein the primary solvent is a methyl ester of a $C_{8-10}$ saturated carboxylic acid.

26. The composition of claim 24 wherein the primary solvent is a mixture comprised of the methyl esters of 55% $C_8$ and 40% $C_{10}$ carboxylic acid.

27. The composition of claim 24 wherein the surfactant having an HLB of from about 4 to about 10 is the isopropyl amine salt of dodecylbenzene sulfonic acid.

28. A process for cleaning a hard surface which comprises contacting the hard surface with an effective amount of a composition of claim 1.

29. A process for cleaning a hard surface which comprises contacting the hard make with an effective amount of a composition of claim 9.

30. A process for cleaning a hard surface which comprises contacting the hard surface with an affective amount of a composition of claim 21.

31. A process for cleaning a hard surface which comprises contacting the hard surface with an effective amount of a composition of claim 22.

32. A process for cleaning a hard surface which comprises contacting the hard surface with an effective amount of a composition of claim 23.

33. A process for cleaning a hard surface which comprises contacting the hard surface with an effective amount of a composition of claim 24.

34. A terpene-free microemulsion for cleaning hard surfaces comprising: (a) from about 40% to about 50% of a methyl ester of a fatty acid comprised of 55% $C_8$ and 40% $C_{10}$ carboxylic acids; (b) from about 5% to about 10% of the isopropylamine salt of a linear alkyl benzene sulfonic acid; (c) from about 1% to about 5% of sodium lauryl sulfate; (d) from about 5% to about 15% propylene glycol n-butyl ether; (e) the remainder water, and wherein the composition is free of non-ionic surfactants.

35. An article comprising a composition of claim 1 and a container.

36. The article of claim 35 wherein the container is a can or a bottle.

37. The article of claim 36 wherein the composition of claim 1 is further comprised of a corrosion inhibitor, a gelling agent or a combination thereof.

38. The article of claim 37 wherein the corrosion inhibitor is selected from the group consisting of an amphoteric surfactant containing an amine functionality, an amine soap of a fatty acid, a fatty amide and combinations thereof.

39. The article of claim 38 wherein the corrosion inhibitor is an amphoteric surfactant containing an amine functionality.

40. The article of claim 37 wherein the gelling agent is methyl cellulose or hydroxypropyl methyl cellulose.

41. An article comprising a composition of claim 34 and a container.

42. The article of claim 41 wherein the container is a can or a bottle.

43. The article of claim 42 wherein the composition of claim 1 is further comprised of a corrosion inhibitor, a gelling agent or a combination thereof.

44. The article of claim 43 wherein the corrosion inhibitor is selected from the group consisting of an amphoteric surfactant containing an amine functionality, an amine soap of a fatty acid, a fatty amide and combinations thereof.

45. The article of claim 44 wherein the corrosion inhibitor is an amphoteric surfactant containing an amine functionality.

46. The article of claim 43 wherein the gelling agent is methyl cellulose or hydroxypropyl methyl cellulose.

47. A process for cleaning a hard surface comprising contacting the hard surface with a terpene-free microemulsion comprising: (a) from about 40% to about 50% of a methyl ester of a fatty acid comprised of 55% $C_8$ end 40% $C_{10}$ carboxylic acids; (b) from about 5% to about 10% of the isopropylamine salt of a linear alkyl benzene sulfonic acid; (c) from about 1% to about 5% of sodium lauryl sulfate; (d) from about 5% to about 15% propylene glycol n-butyl ether; (e) the remainder water, and wherein the composition is free of non-ionic surfactant.

48. The process of claim 47 wherein the hard surface is contacted by spraying or brushing the microemulsion onto the surface.

49. The article of claim 48 wherein the composition of claim 1 is further comprised of corrosion inhibitor, a gelling agent or a combination thereof.

50. The article of claim 49 wherein the corrosion inhibitor is selected from the group consisting of an amphoteric surfactant containing an amine functionality, an amine soap of fatty acid, a fatty amide and combinations thereof.

51. The article of claim 49 wherein the corrosion inhibitor is an amphoteric surfactant containing an amine functionality.

52. The article of claim 49 wherein the gelling agent is methyl cellulose or hydroxypropyl methyl cellulose.

* * * * *